(12) United States Patent
Fujita et al.

(10) Patent No.: US 8,675,254 B2
(45) Date of Patent: Mar. 18, 2014

(54) IMAGE PROCESSING DEVICE, IMAGE PROCESSING METHOD AND PROGRAM FOR SAME, AND PRINTING SYSTEM

(75) Inventors: Toru Fujita, Nagano (JP); Minoru Koyama, Nagano (JP)

(73) Assignee: Seiko Epson Corporation, Tokyo (JP)

( * ) Notice: Subject to any disclaimer, the term of this patent is extended or adjusted under 35 U.S.C. 154(b) by 151 days.

(21) Appl. No.: 13/362,197

(22) Filed: Jan. 31, 2012

(65) Prior Publication Data
US 2012/0200867 A1 Aug. 9, 2012

(30) Foreign Application Priority Data
Feb. 7, 2011 (JP) .................................. 2011-024410

(51) Int. Cl.
*H04N 1/60* (2006.01)

(52) U.S. Cl.
USPC ........... 358/1.9; 358/518; 358/3.24; 345/419; 345/606; 399/130

(58) Field of Classification Search
None
See application file for complete search history.

(56) References Cited

U.S. PATENT DOCUMENTS

| | | | |
|---|---|---|---|
| 7,561,301 B2 | 7/2009 | Osumi et al. | |
| 2008/0297818 A1* | 12/2008 | Shimbaru | 358/1.9 |
| 2011/0051208 A1* | 3/2011 | Hirano et al. | 358/518 |

FOREIGN PATENT DOCUMENTS

| | | | |
|---|---|---|---|
| JP | 63-104816 A | 5/1988 | |
| JP | 11-119409 A | 4/1999 | |
| JP | 2005-199625 A | 7/2005 | |
| JP | 2005-262746 A | 9/2005 | |

* cited by examiner

*Primary Examiner* — Houshang Safaipour
*Assistant Examiner* — Idowu O Osifade
(74) *Attorney, Agent, or Firm* — Global IP Counselors, LLP (57) ABSTRACT

An image processing device includes: a storage part configured to store a correlation between a pre-deformation color and a post-deformation color that reflects a color variation accompanying a deformation of a medium, with respect to a degree of deformation of the medium; an acquisition part configured to acquire degree-of-deformation information and color information for each region of a deformed object; and a determination part configured to determine a color of the image based on the degree-of-deformation information, the color information, and the correlation, so that the post-deformation color of each region of the deformed object approximates the color information.

12 Claims, 6 Drawing Sheets

| Element No. | Area Variation Ratio ΔS |
|---|---|
| 1 | 114% |
| 2 | 128% |
| 3 | 142% |
| 4 | 154% |
| 5 | 166% |
| 6 | 176% |
| 7 | 184% |
| 8 | 191% |
| 9 | 196% |
| 10 | 199% |
| 11 | 200% |
| 12 | 199% |
| 13 | 196% |
| 14 | 191% |
| ⋮ | |

Fig. 8

IMAGE PROCESSING DEVICE, IMAGE PROCESSING METHOD AND PROGRAM FOR SAME, AND PRINTING SYSTEM

CROSS-REFERENCE TO RELATED APPLICATIONS

This application claims priority to Japanese Patent Application No. 2011-024410 filed on Feb. 7, 2011. The entire disclosure of Japanese Patent Application No. 2011-024410 is hereby incorporated herein by reference.

BACKGROUND

1. Technical Field

The present invention relates to an image processing device and image processing method for a deformed object obtained by deformation after an image is formed on a medium.

2. Related Art

As an example of this type of image processing device, a device has been proposed for fabricating a block copy having a design required by a designer in a case in which a degree of deformation characteristic of a shape due to molding fabrication is comprehended based on pre-molding data of a test block copy having a grid formed thereon, and post-molding data obtained by scanning a three-dimensional object obtained by molding an object printed with the test block copy, and a three-dimensional object is molded based on the comprehended characteristic (refer to Japanese Laid-Open Patent Publication No. 11-119409, for example). A technique has also been proposed for computing the distortion of a picture before and after molding thereof and recording the result as a mapping function, fabricating a printed picture that is deformed based on the mapping function so as to cancel out the distortion of the picture, recording the film density variation from before to after molding as a density variation function, and correcting the density of the printed picture based on the density variation function (refer to Japanese Laid-Open Patent Publication No. 2005-199625, for example).

SUMMARY

However, in the device of Japanese Laid-Open Patent Publication No. 11-119409, although deformation of the shape due to molding fabrication is considered, variation of color due to molding fabrication is not considered. In the device of Japanese Laid-Open Patent Publication No. 2005-199625, although density variation of the color due to molding fabrication is considered, the distortion of the picture from before to after molding must be computed and recorded as a mapping function each time the molded object changes, and the film density variation from before to after molding must be recorded as a density variation function. Complex processing is therefore involved.

A purpose of the image processing device and image processing method of the present invention is to smoothly determine the color of an image that is to be formed on a medium so that the effect of color variation due to deformation is precisely reflected.

The means described below are employed in the image processing device and image processing method of the present invention in order to achieve the principal purpose of the present invention.

An image processing device according to one aspect of the present invention is a device for a deformed object obtained by deformation of a medium after an image is formed on the medium. The image processing device includes a storage part, an acquisition part and a determination part. The storage part is configured to store a correlation between a pre-deformation color and a post-deformation color that reflects a color variation accompanying a deformation, with respect to a degree of deformation of the medium. The acquisition part is configured to acquire degree-of-deformation information and color information for each region of the deformed object. The determination part is configured to determine a color of the image based on the degree-of-deformation information, the color information, and the correlation, so that the post-deformation color of each region of the deformed object approximates the color information.

In the image processing device of the present invention, the correlation between the pre-deformation color and the post-deformation color that reflects a color variation accompanying a deformation, with respect to the degree of deformation of the medium, is stored in advance. Degree-of-deformation information and color information for each region of the deformed object are acquired, and the color of the image is determined based on the degree-of-deformation information, the color information, and the correlation so that the post-deformation color of each region of the deformed object approximates the color information. It is thereby possible to determine the color of an image that is to be formed on a medium so that the degree of deformation and the color variation that accompanies deformation in each region are precisely reflected. Such a determination of color can also be performed smoothly using the correlation. As a result, it is possible to smoothly determine the color of an image that is to be formed on the medium so that the effect of color variation due to deformation is precisely reflected.

In the image processing device as described above, the correlation is preferably a relationship created in advance by deforming a color sample including a plurality of colors with different area variation ratios and measuring the colors after deformation so that each color value of the colors of the color sample is designated as the pre-deformation color, a post-deformation measured color value of the colors of the color sample is designated as the post-deformation color and each of the area deformation ratios is designated as the degree of deformation. A correlation in which the actual degree of deformation or the actual color variation is more accurately reflected can thereby be used, and the color to be formed on the medium can be more precisely determined.

In the image processing device as described above, the correlation is preferably created in advance for each type of the medium. It is thereby possible to adapt to a plurality of types of media.

The image processing device as described above preferably further includes a position information input part configured to form a grid having a plurality polygons as elements in advance on the medium prior to deformation, and to input position information of each grid point of the grid before and after deformation of the medium. The acquisition part is preferably configured to acquire a color of each of the elements as the color information for each region of the deformed object and to acquire the area deformation ratio of each of the elements as the degree-of-deformation information for each region of the deformed object. The determination part is preferably configured to determine the color of each of the elements based on the correlation and the area deformation ratios of the element. The color of the image can thereby be determined by simple processing using a grid.

In the image processing device as described above, the correlation is preferably a relationship in which a color value determined by a combination of primary colors in a generic color standard is specified as the pre-deformation color. The data in which the color to be formed in each region of the medium is set is thereby in a generic format that easily be edited by a generic image editing tool or the like. Alternatively, the correlation is preferably a relationship in which a color value determined by a combination of colorants used for forming the image on the medium is specified as the pre-deformation color. Formation of an image on the medium using a colorant can thereby be smoothly initiated after the color to be formed in each region of the medium is set.

Furthermore, in the image processing device as described above, the correlation is preferably a relationship in which a color value determined by a color space of displayable hues is specified as the post-deformation color. Here, when the medium is deformed, variation can occur not only in the density of the color but also in the hue of the color of the image that is formed on the medium. Therefore, by using a color space of displayable hues to specify the post-deformation color, the effect of color variation that accompanies deformation can be more precisely reflected.

In the image processing device as described above, the correlation is preferably a relationship created as a lookup table. Processing can thereby be efficiently performed with a reduced computational load.

An image processing method according to another aspect of the present invention is a method for a deformed object obtained by deformation of a medium after an image is formed on the medium. The image processing method includes: acquiring degree-of-deformation information and color information for each region of the deformed object; and determining a color of the image based on the degree-of-deformation information, the color information, and a correlation between a pre-deformation color and a post-deformation color that reflects a color variation accompanying a deformation, with respect to a degree of deformation of the medium, so that the post-deformation color of each region of the deformed object approximates the color information.

In the image processing method of the present invention, degree-of-deformation information and color information for each region of the deformed object are acquired, and the color of the image is determined based on the degree-of-deformation information, the color information, and the correlation between the pre-deformation color and the post-deformation color that reflects the color variation accompanying the deformation, with respect to the degree of deformation of the medium, so that the post-deformation color of each region of the deformed object approximates the color information. It is thereby possible to determine the color of an image that is to be formed on a medium so that the degree of deformation and the color variation that accompanies deformation in each region are precisely reflected. Such a determination of color can also be performed smoothly using the correlation. As a result, it is possible to smoothly determine the color of an image that is to be formed on the medium so that the effect of color variation due to deformation is precisely reflected. In this image processing method, various embodiments of the image processing device described above may be used, and steps which realize the functions of the image processing device described above may also be added.

The image processing method described above may further includes creating the correlation by deforming a color sample including a plurality of colors with different area variation ratios, measuring the colors after deformation, and correlating each color value of the colors of the color sample as the pre-deformation color and a post-deformation measured color value of the colors of the color sample as the post-deformation color with respect to each of the area deformation ratios as the degree of deformation.

It is thereby possible to determine the color of an image that is to be formed on a medium so that the degree of deformation and the color variation that accompanies deformation in each region are precisely reflected. Such a determination of color can also be performed smoothly using the correlation. As a result, it is possible to smoothly determine the color of an image that is to be formed on the medium so that the effect of color variation due to deformation is precisely reflected.

The program of the present invention is designed to realize the steps of the image processing method described above in one or more computers.

The program may be recorded in a non-transitory recording medium (e.g., hard disk, ROM, FD, CD, DVD, or the like) that is readable by computer, or may be delivered from one computer to another computer via a transmission medium (Internet, LAN, or other communication network), or may be transferred by any other method. Insofar as the program is executed by one computer or the steps thereof are executed in distributed fashion by a plurality of computers, the steps of the image processing method described above are executed, and the same operational effects as those of the image processing method are therefore obtained.

The printing system of the present invention includes a storage unit in which the program described above is stored, and a printer configured to print the image based on printing data outputted from the personal computer. The steps of the image processing method described above are executed by this printing system, and the same operational effects as those of the image processing method are therefore obtained.

BRIEF DESCRIPTION OF THE DRAWINGS

Referring now to the attached drawings which form a part of this original disclosure.

DETAILED DESCRIPTION OF EXEMPLARY EMBODIMENTS

Figure 1:
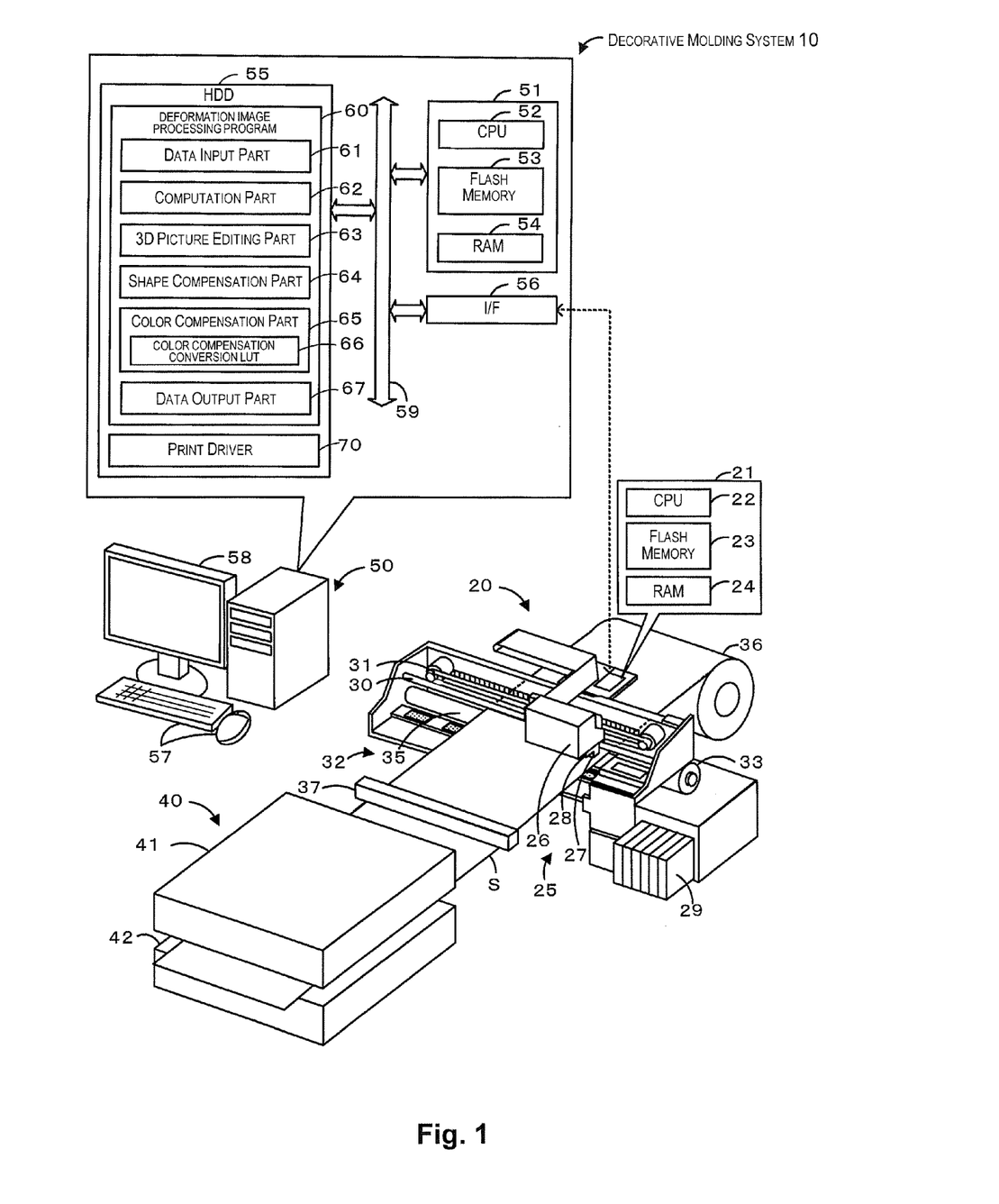
FIG. 1 is a schematic view showing an example of the overall configuration of the decorative molding system 10.

Embodiments of the present invention will next be described using the accompanying drawings. FIG. 1 is a schematic view showing an example of the overall configuration of a decorative molding system 10 as the present embodiment. As shown in FIG. 1, the decorative molding system 10 of the present embodiment is provided with a printer 20 for forming an image by discharging ink onto a medium S that is withdrawn from a roll 36 formed by winding a resin sheet (e.g., polyethylene film) or other medium S into a roll shape; a molding device 40 for molding the medium S into a desired three-dimensional shape after an image has been printed on the medium S; and a generic personal computer (PC) 50 having the function of an image processing device for inputting an image that is to be formed on the medium S, processing the image into printing data, and outputting the printing data, the personal computer 50 being connected so as to be capable of communicating data to the printer 20. The printer 20 and the personal computer 50 constitute a printing system.

The printer 20 is provided with a controller 21 for controlling the device as a whole; a printing mechanism 25 for discharging ink to the medium S; and a conveyance mechanism 32 for conveying the medium S while unwinding the medium S from the roll 36. The controller 21 is configured as a microprocessor centered around a CPU 22, and is provided with a flash memory 23 capable of storing various processing programs and rewriting data, a RAM 24 for performing such functions as temporarily storing data and preserving data, and other components. The controller 21 receives the printing data from the PC 50 and controls the printing mechanism 25 or the conveyance mechanism 32 so as to execute printing processing. The printing mechanism 25 is provided with a carriage 26 which is reciprocated left and right (primary scanning direction) along a carriage shaft 30 by a carriage belt 31; a print head 28 for applying pressure to an ink to discharge ink droplets from nozzles 27; and a cartridge 29 for accommodating various colors of ink. The print head 28 is provided below the carriage 26, and forms dots on the medium S by discharging each color of ink from the nozzles 27 provided to a bottom surface of the print head 28 by a scheme in which a voltage is applied to a piezoelectric element to cause the piezoelectric element to deform and apply pressure to the ink. The mechanism for applying pressure to the ink may also function by using heat of a heater to form a bubble. The cartridge 29 is mounted on the main body side of the device and separately accommodates colors of ink such as cyan (c), magenta (m), yellow (y), black (k), orange (o), and purple (p) in a cmykop system and feeds the accommodated ink to the print head 28 via tubes not shown in the drawing. The conveyance mechanism 32 is driven by a drive motor 33, and is provided with a conveyance roller 35 for conveying the medium S, and other components.

The molding device 40 is provided with a top die part 41 disposed above the medium S, and a bottom die part 42 disposed below the medium S. A metal mold not shown in the drawing is set in the top die part 41 or the bottom die part 42, and molds the medium S into a three-dimensional shape by holding the medium S between upper and lower metal molds. Molding by the molding device 40 may be accomplished by hot forming or compression molding. The metal mold that is set in the molding device 40 can be replaced with a plurality of different types of metal molds. Before or after molding, the medium S is cut to a predetermined length by a cutter 37 disposed between the printer 20 and the molding device 40.

The PC 50 is provided with a controller 51 for controlling the device as a whole; a high-capacity memory HDD 55 as a storage unit for storing various application programs or various data files; a network interface (I/F) 56 for performing data input and output with respect to the printer 20 and other external instruments; a keyboard, mouse, or other input device 57 for inputting various commands of a user; and a display 58 for displaying various types of information. The controller 51 is provided with a CPU 52 for executing various types of control; a flash memory 53 for storing various types of control programs; a RAM 54 for temporarily storing data; and other components. The PC 50 has the function of executing operations in accordance with the input operation when a user performs an input operation via the input device 57 using a cursor or the like that is displayed on the display 58. The controller 51, HDD 55, I/F 56, input device 57, display 58, and other components are electrically connected by a bus 59 and configured so as to be able to exchange various control signals and data.

An application program not shown in the drawing, a deformation image processing program 60, a print driver 70, and the like are stored in the HDD 55 of the PC 50. The deformation image processing program 60 is a program used in order to correct shape misalignment or color misalignment that occurs in the image (including characters, patterns, and the like) formed on a surface of a molded article (medium S after molding) due to deformation that accompanies molding of the medium S. The deformation image processing program 60 has a data input part 61 for inputting various types of data; a computation part 62 for computing values necessary for processing from the inputted data; a 3D picture editing part 63 for editing a three-dimensional image (picture) model; a shape compensation part 64 for compensating for shape misalignment that accompanies molding; a color compensation part 65 for compensating for color misalignment that accompanies molding; and a data output part 67 for outputting the processed data. The data input part 61 has such functions as inputting position information of each grid point of a grid from before and after molding of the medium S, the grid being formed on the medium S and having a plurality of quadrangles as elements thereof, and inputting an image that is to be formed on the medium S. The computation part 62 has such functions as computing the direction and amount of distortion of each grid point based on the position information of each grid point of the grid inputted by the data input part 61 before and after molding, and computing the area variation of each quadrangle of the grid from before to after molding. The 3D picture editing part 63 has the function of editing the image formed on the medium S before molding, and editing the image formed on the medium S after molding, based on the position information of the grid points inputted by the data input part 61. The shape compensation part 64 has the function of performing shape compensation whereby a shape variation of the image on the molded article surface that occurs due to deformation of the medium S during molding is corrected to obtain the desired shape. The color compensation part 65 has the function of performing color compensation whereby the color of the image is corrected to the desired color through use of a color compensation conversion lookup table (LUT) 66 which reflects a variation in hue of the image due to deformation during molding of the medium S. The color compensation conversion LUT 66 is described hereinafter. The data output part 67 has the function of outputting the corrected image data for which shape misalignment or color misalignment has been corrected to the print driver 70, to an application program not shown in the drawing, or to another destination. The data input part 61, the computation part 62, the 3D picture editing part 63, the shape compensation part 64, the color compensation part 65, and the data output part 67 are incorporated into the deformation image processing program as a data input module, a computation module, a 3D picture editing module, a shape compensation module, a color compensation module, and a data output module, respectively. These modules are executed by the controller 51 to perform each of the functions described above. The print driver 70 is a program for converting a print job received from an application program into print data that can be directly printed by the printer 20, and outputting (transmitting) the print data to the printer 20. The print driver 70 also has the function of outputting the print data created by the deformation image processing program 60 to the printer 20.

Figure 2:
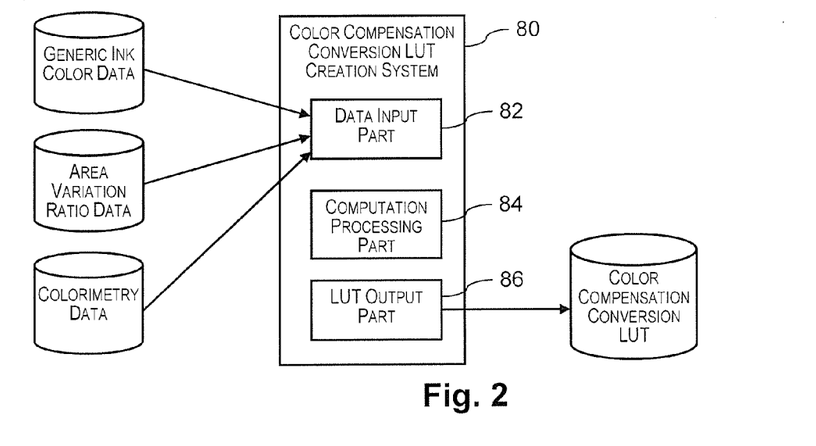
FIG. 2 is a schematic view showing an example of the overall configuration of the color compensation conversion LUT creation system 80.
Figure 3:
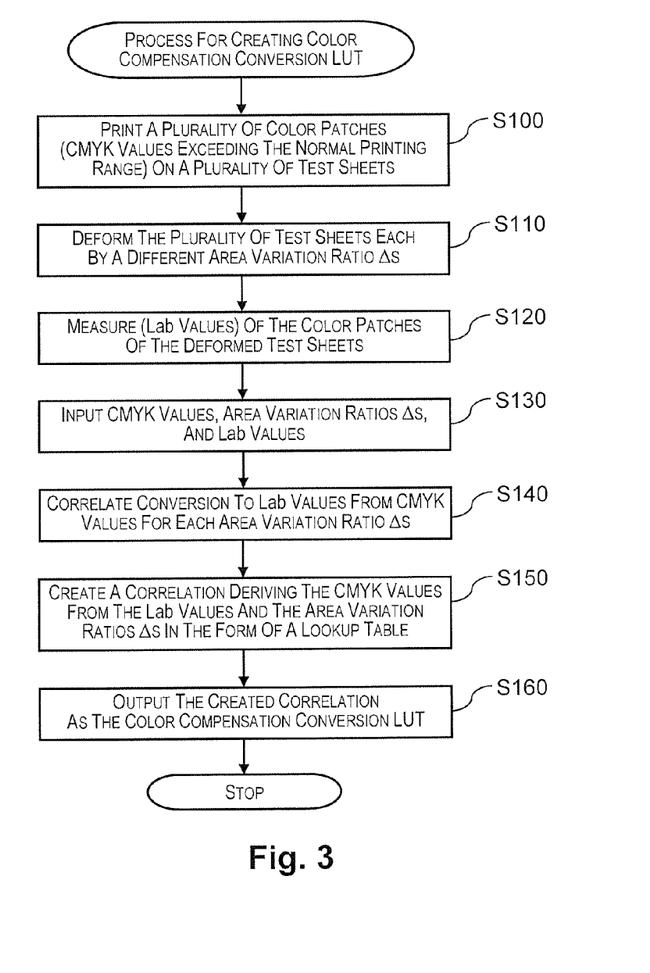
FIG. 3 is a process view showing an example of the process for creating the color compensation conversion LUT 66.

The color compensation conversion LUT 66 used in color compensation processing will next be described. The color compensation conversion LUT 66 is created in a color compensation conversion LUT creation system 80 as a correlation table in which there is a specified relationship between post-deformation color values that reflect color variation accompanying deformation of the medium S during molding thereof, the degree of deformation of the medium S that accompanies molding, and the pre-deformation color values that are formed (printed) on the medium S prior to molding. FIG. 2 is a schematic view showing an example of the overall configuration of the color compensation conversion LUT creation system 80. The color compensation conversion LUT creation system 80 has a data input part 82 for inputting various types of data that are necessary for processing, such as generic ink color data, data of area variation ratios of the medium S, and post-deformation measured color data; a computation processing part 84 for creating the color compensation conversion LUT 66 using the inputted data; and a LUT output part 86 for outputting the created color compensation conversion LUT 66. In the color compensation conversion LUT 66, combinations of primary colors used in a generic color standard are used as the pre-deformation color values that are formed on the medium S prior to molding. The combinations of primary colors used are combinations of the CMYK color components (indicated here in capital letters to distinguish from the ink colors of the printer 20) cyan (C), magenta (M), yellow (Y), and black (K) conformable to the color standard of the Japan Color certification system. The process performed using the color compensation conversion LUT creation system 80 to create the color compensation conversion LUT 66 will next be described. FIG. 3 is a process view showing an example of the process for creating the color compensation conversion LUT 66.

In the process for creating the color compensation conversion LUT, a plurality of test sheets (medium S) of the same material as the medium S used in actual molding is first prepared, and printing is performed to print a plurality of color patches on each of the test sheets (step S100). The data used to print the color patches are specified by combinations of the generic CMYK values described above; specifically, in the combinations used, the CMYK color components are varied in units of 50% within a range that exceeds the normal printing range of 0% to 500%, where 100% is the discharged amount of ink necessary to form a patch of maximum density in normal printing where no molding is performed after printing. In cases where the medium S is molded after printing, ink quantities which exceed those of the normal printing range are sometimes used in order to prevent reduction of color density due to significant stretching of the image. In order to adapt to such cases, combinations of CMYK that include values exceeding 100% for each color component are used as the CMYK combinations. In a case in which the combinations of generic CMYK values thus specified are converted prior to printing into combinations of each color of ink used by the printing device, and printing is performed using the printer 20 described above, for example, the values are converted before printing from combinations of CMYK values to cmykop values as combinations of each color of ink. Deformation processing is then performed to deform the plurality of test sheets on which the color patches are printed, so that each test sheet is deformed by a different area variation ratio Δs (step S110). The area variation ratio Δs is obtained by dividing the area of the deformed test sheet by the area thereof prior to deformation, and a range thereof specified for molding is large enough to adequately encompass the range of deformation of the medium S when the medium S is subjected to various types of molding using a plurality of different types of metal molds in the molding device 40. In the present embodiment, test sheets are deformed by a total of seven area variation ratios Δs in increments of 50% from 100% (no deformation) to 400%. In order to perform the seven deformations, seven test sheets are prepared and printed in step S100. The deformations in step S110 are performed using a device capable of uniformly deforming each test sheet in the entirety thereof according to the specified area variation ratio Δs, rather than using the metal molds for actual molding that are set in the molding device 40. When deformation is thus performed, colorimetry processing is then performed for measuring the color of all the color patches of each deformed test sheet (step S120). This colorimetry processing is performed by using a spectrophotometer, for example, to calculate color coordinate values (referred to as Lab values hereinafter) in the L*a*b* color space for representing hue, saturation, and brightness.

Figure 4:
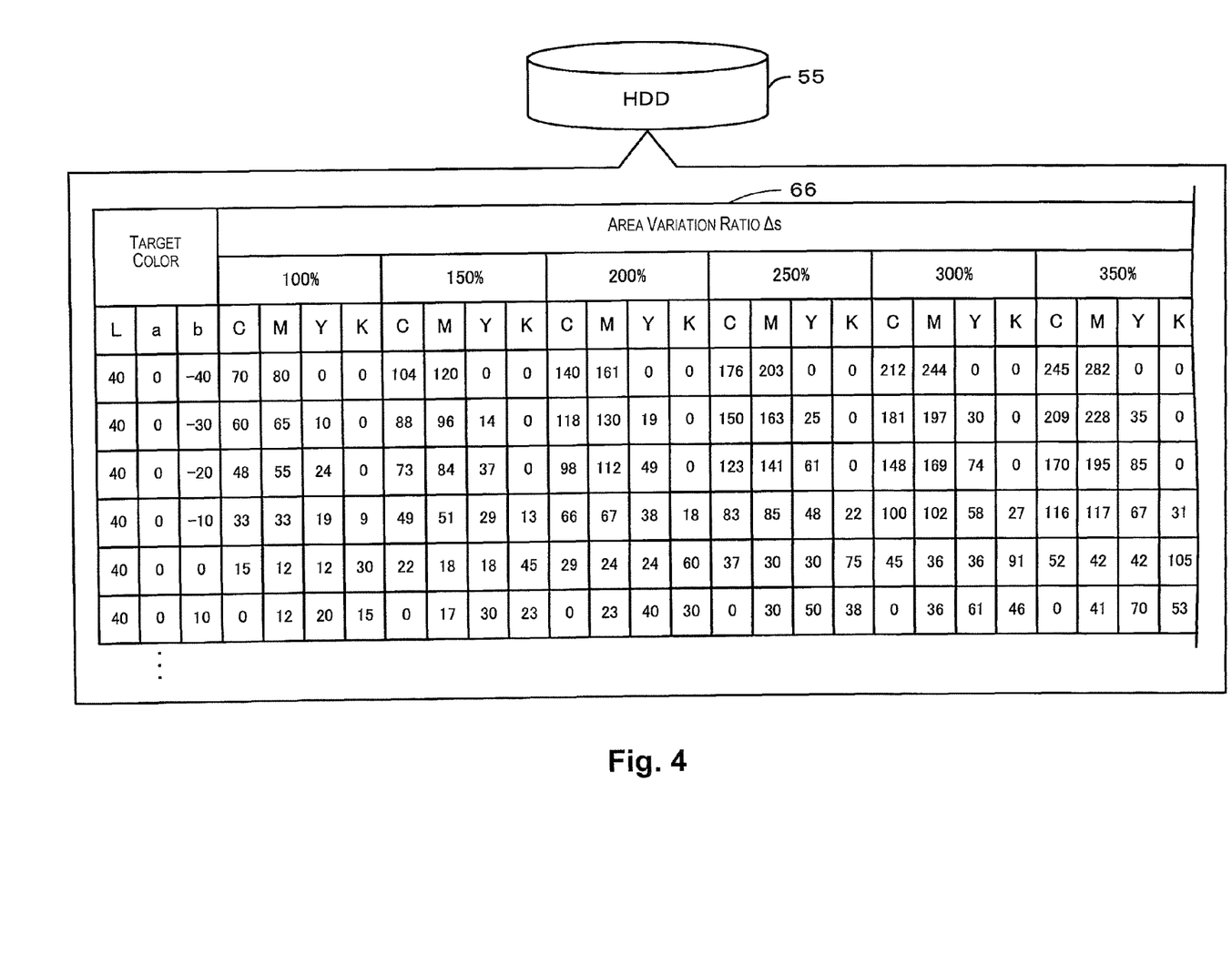
FIG. 4 is a view showing an example of the color compensation conversion LUT 66.

When printing processing, deformation processing, and colorimetry processing are performed in this manner, input processing is performed for inputting the CMYK values as generic ink color data, the area variation ratios Δs as area variation ratio data, and Lab values as colorimetry data to the data input part 82 of the color compensation conversion LUT creation system 80 as the data that are necessary for processing (step S130). Processing for correlating a conversion from the pre-deformation CMYK values to the post-deformation Lab values for each area variation ratio Δs is then performed by a computation processing part 84 (step S140). Creation processing for creating a correlation in the form of a lookup table for deriving the pre-deformation CMYK values by inverse conversion from the post-deformation Lab values and the area variation ratios Δs is performed based on the correlated conversion from CMYK values to Lab values for each area variation ratio Δs (step S150), the created correlation in the form of a lookup table is outputted as the color compensation conversion LUT 66 from the LUT output part 86 (step S160), and this process is ended. In the creation processing of step S150, processing is performed for calculating the CMYK value for the color obtained by varying each Lab value by ten units for each area variation ratio Δs. At this time, in the case that the CMYK value for the color obtained by varying each Lab value by ten units is not correlated in step S140, the value is calculated by interpolation from nearby values. FIG. 4 shows an example of the color compensation conversion LUT 66 created by this creation step. FIG. 4 shows only a portion of the color compensation conversion LUT 66. As shown in FIG. 4, the pre-deformation generic CMYK values can be derived when the post-deformation Lab values and area variation ratio Δs are given, and the established trend is that the CMYK values increase the larger the area variation ratio Δs is. Since the color compensation conversion LUT 66 is created as a correlation that uses Lab values capable of representing hues, it is possible to more precisely reflect the effect of color variation by including variation in hue in the color compensation processing described hereinafter. A color compensation conversion LUT 66 is thus created that specifies a correlation between Lab values as post-deformation color values, area variation ratios Δs as degrees of deformation, and CMYK values as pre-deformation color values, and the color compensation conversion LUT 66 thus created is stored in the HDD 55 of the PC 50.

Figure 5:
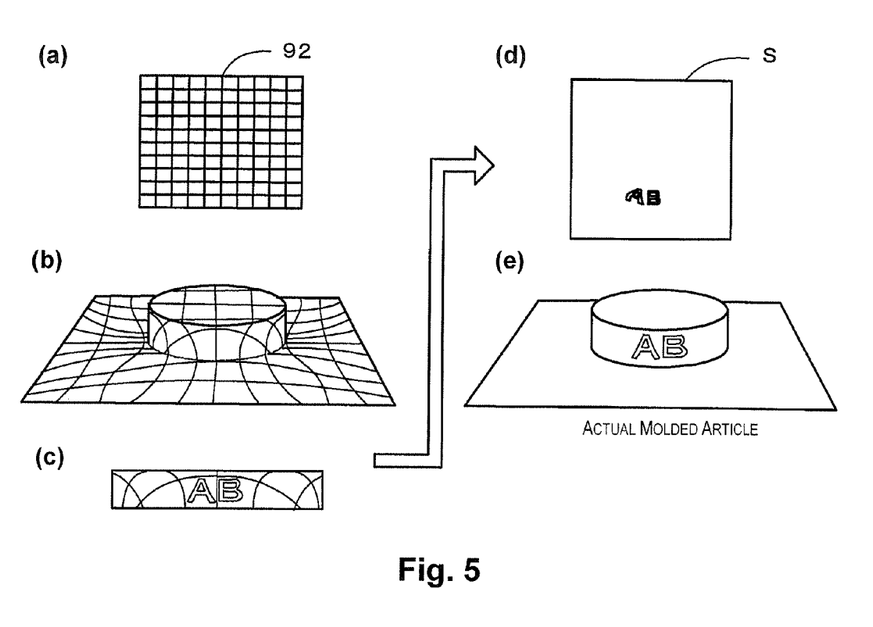
FIG. 5 is a view showing the shape compensation processing.

Processing by the decorative molding system 10 of the present embodiment configured as described above will next be described, beginning with the shape compensation processing. FIG. 5 is a view showing the shape compensation processing executed by the deformation image processing program 60. In this shape compensation processing, the CPU 52 of the controller 51 first creates an image in which a grid 92 composed of quadrangles (squares) having a plurality of grid points at equal intervals along vertical and horizontal axes is formed on a flat medium (FIG. 5(a)). For convenience in the drawing, the number of grid points shown is smaller than the actual number of grid points in the grid 92 (the grid is thinned out), and the interval between grid points shown is greater than the dot formation interval (e.g., 720 dpi or 1440 dpi) of the printer 20. The position information of the initial positions (pre-deformation positions) of the grid points is retained. Processing is then performed for deforming the medium so as to be molded to the shape of the desired product, the position information of the grid points of the grid 92 before and after deformation is inputted, and the three-dimensional coordinate positions of the grid points, the distortion direction of the grid points, and the distortion amount after deformation are computed. Based on the computed results, a three-dimensional image model is created of the solid object after molding, and the created three-dimensional image model is displayed on the display 58 (FIG. 5(b)). When the position of a picture on the three-dimensional image model is then specified by a user input operation, an image to be printed as the picture is placed in the specified position (FIG. 5(c)), and when an instruction for two-dimensional conversion is inputted, the coordinate values in three dimensions are converted to two-dimensional coordinates and the converted image is displayed (FIG. 5(d)). An image in the shape of the desired picture after molding can thus be formed on the medium prior to molding, and the block copy data to be printed on the medium S can be created prior to molding. FIG. 5(e) shows the actual molded article obtained by molding after printing the image of the block copy data of FIG. 5(d) on the medium S. The block copy data thus created are subjected to the color compensation processing described below.

Figure 6:
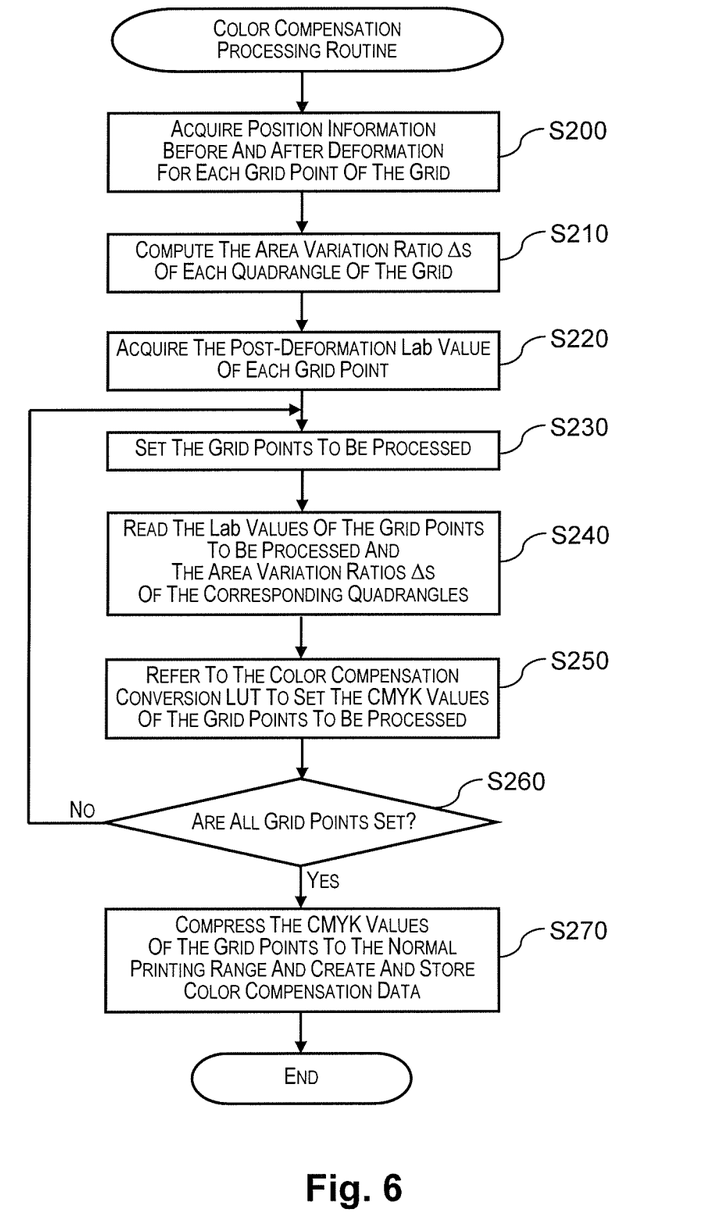
FIG. 6 is a flowchart showing an example of the color compensation processing routine.

The color compensation processing using the color compensation conversion LUT 66 will next be described. FIG. 6 is a flowchart showing an example of the color compensation processing routine executed by the CPU 52 of the controller 51. This routine is stored in the HDD 55 and is executed when an execution instruction for color compensation is inputted after shape compensation processing has been performed. The instruction to execute color compensation may be inputted by, for example, clicking a color compensation execution button on an editing screen using the input device 57 when the editing screen (not shown in the drawing) of the deformation image processing program 60 is displayed on the display 58 after shape compensation processing.

Figure 7:
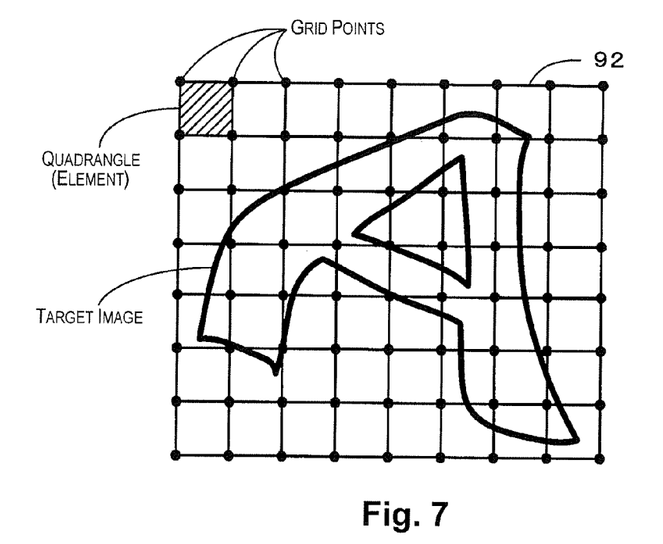
FIG. 7 is a view showing the lattice points and quadrangles of the grid 92.
Figure 8:
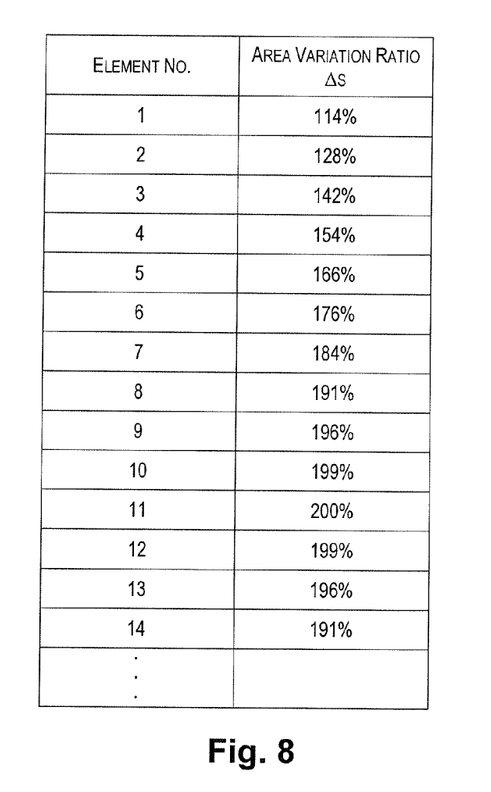
FIG. 8 is a view showing an example of the computed area variation rate Δs for each quadrangle.

When this color compensation processing routine is executed, the CPU 52 first acquires the position information of the grid points of the grid 92 from before and after deformation fabrication (step S200). The position information is acquired by acquiring the three-dimensional coordinates of the grid points before and after deformation, from the shape compensation processing described above. The area variation ratios $\Delta s$ of the quadrangles as units of the grid 92 are then computed from the acquired position information of the grid points (step S210). FIG. 7 shows the grid points and quadrangles of the grid 92. In FIG. 7, a portion of the grid 92 is shown enlarged, and the target image (letter A) in FIG. 7 is the shape-compensated image (refer to FIG. 5(d)) when placed on the grid. The area variation ratio $\Delta s$ of each quadrangle is computed by computing the area of each quadrangle before and after deformation from the pre- and post-deformation position information of each grid point acquired in step S200 and dividing the area of each quadrangle after deformation by the area thereof before deformation. Since the area of each quadrangle before deformation is the same, a constant value may be used. FIG. 8 shows an example of the area variation ratio $\Delta s$ of each quadrangle computed as described above. The values in the "Element No." column are assigned in order from left to right and top to bottom starting with the top left quadrangle of the grid 92. The Lab values of the grid points of the grid 92 are then acquired (step S220). The Lab values can be acquired by calculating the color values of the image after shape compensation processing for the positions that correspond to each grid point, based on the RGB values, CMYK values, or other color information of the inputted image, and converting the color values thus calculated into Lab values. Alternatively, the Lab values may be acquired by displaying an editing screen (not shown in the drawing) that includes a shape-compensated image such as the one shown in FIG. 5(d) or FIG. 7 on the display 58, receiving a specification of a color of the image through use of the input device 57, calculating the color values of the positions corresponding to the grid points based on the received color, and converting the calculated color values into Lab values.

When the Lab values of the grid points or the area variation ratios $\Delta s$ of the quadrangles of the grid 92 are thus acquired, the grid points to be processed are set (step S230), and the Lab values of the grid points to be processed and the area variation ratios $\Delta s$ of the quadrangles that correspond to the grid points to be processed are each read (step S240). The grid points to be processed are set in order from left to right and top to bottom, starting with the grid point in the top left corner of the grid 92. The quadrangle that corresponds to a grid point that is to be processed may be specified as the quadrangle that has the grid point to be processed at the top left corner thereof, and in the case that there is no quadrangle that has the grid point to be processed at the top left corner thereof, as in the case of the grid points at the right end or bottom end of the grid 92, the quadrangle that has the grid point to be processed at the top right corner thereof, or the quadrangle that has the grid point to be processed at the bottom left or bottom right corner thereof may be specified.

The CMYK values as pre-deformation color values obtained from the color compensation conversion LUT 66 are then set as the CMYK values of the grid points to be processed, using the read Lab values as post-deformation color values and using the area variation ratios $\Delta s$ (step S250). In the case that the read Lab values and the area variation ratios $\Delta s$ are registered in the color compensation conversion LUT 66, the corresponding values are derived from the color compensation conversion LUT 66 and set as the CMYK values of the grid points to be processed. In the case that the read Lab values or the area variation ratios $\Delta s$ are not registered in the color compensation conversion LUT 66, values calculated by extracting nearby CMYK values from the color compensation conversion LUT 66 and performing interpolation are set as the CMYK values of the grid points to be processed. When the CMYK values are thus set, a determination is made as to whether the CMYK values of all the grid points of the grid 92 are set (step S260), and when some grid points are not yet set, the process returns to step S230, the grid points are set in sequence as grid points to be processed, and processing is repeated. When the CMYK values of all the grid points are set, the CMYK values of the grid points are each compressed to the normal printing range to create color compensation data that is stored in the HDD 55 (step S270), and the routine is ended. Here, since the CMYK values in the color compensation conversion LUT 66 range to 500%, the CMYK values set for each grid point are multiplied by 1/5 in order to compress to the normal printing range (0 to 100%). Of course, since the values used are for the generic ink colors CMYK in the present embodiment, compression to the normal printing range enables the created color compensation data to be used by a wide variety of image editing tools and other application software. When printing is performed using the color compensation data, the print driver 70 or the like is used to perform processing for interpolating the CMYK values of the grid points of the grid 92 according to the dot formation interval of the printer 20, and creating data for printing by multiplying five by the values obtained by converting the generic CMYK ink color values to cmykop values for the ink colors of the printer 20, thus returning the values to the pre-compression numeric range.

Thus, in the color compensation processing routine shown in FIG. 6, color compensation data are created by setting the CMYK values of the grid points from the color compensation conversion LUT 66 using the area variation ratios Δs of each quadrangle and the Lab values as the post-deformation color values of the grid points. The CMYK values of the grid points can thereby be set so as to precisely reflect the effect of color variation that accompanies area variations in the individual elements (quadrangles) of the grid 92 of the medium S, and by extension, color compensation data can be created that precisely reflect the effect of color variation due to deformation of the medium S as a whole. Since the color compensation conversion LUT 66 is stored in the HDD 55 in advance in the form of a lookup table, processing can be efficiently performed with a reduced computational load. Since the range of area variation ratios Δs in the color compensation conversion LUT 66 is set large enough to adequately encompass the range of deformation by actual molding of the medium S, the color compensation conversion LUT 66 can be made widely applicable to various types of molding using the medium S. This is the reason for adopting a configuration whereby a correlation between the Lab values as post-deformation color values, the area variation ratio Δs as the degree of deformation, and the CMYK values as pre-deformation color values is created as the color compensation conversion LUT 66 and stored in advance in the HDD 55, and the color compensation conversion LUT 66 is used to create color compensation data.

The correspondence between the constituent elements of the present embodiment and the constituent elements of the present invention is clarified herein. The HDD 55 of the PC 50 of corresponds to the "storage part" in the present embodiment, the controller 51, computation part 62, 3D picture editing part 63, and color compensation part 65 for executing the processing of steps S210, S220, and S240 of the color compensation processing routine of FIG. 6 correspond to the "acquisition part," and the controller 51 and color compensation part 65 for executing the processing of step S250 of the color compensation processing routine correspond to the "determination part" in the present embodiment. In the present embodiment, the description of the operation of the PC 50 also clarifies an example of the image processing method of the present invention.

The PC 50 of the present embodiment described above creates the color compensation conversion LUT 66 for specifying the correlation between the Lab values as post-deformation color values, the area variation ratio Δs as the degree of deformation, and the CMYK values as pre-deformation color values, and stores the color compensation conversion LUT 66 in advance in the HDD 55. Before an image is printed, the Lab values of the grid points of the grid 92 on the medium S, and the area variation ratio Δs of each quadrangle of the grid 92 are acquired, and the acquired Lab values and area variation ratios Δs are used to set each CMYK value that is to be formed at the grid points of the grid 92 on the medium S from the color compensation conversion LUT 66. It is thereby possible to smoothly determine the color of an image that is to be formed on the medium S so that the effect of color variation due to deformation is precisely reflected.

Since the color compensation conversion LUT 66 is a correlation that uses generic CMYK ink color values, the created color compensation data can be used by a wide variety of image editing tools and other application software. Furthermore, since the color compensation conversion LUT 66 is a correlation that uses Lab values capable of representing hues, it is possible to more precisely reflect the effect of color variation by including variation in hue. Since the color compensation conversion LUT 66 is a correlation created as a lookup table, processing can be efficiently performed with a reduced computational load.

The present invention is not limited by the embodiment described above, and can be implemented in various ways within the technical scope of the present invention.

In the embodiment described above, the printer 20 has six ink colors cmykop, but this configuration is not limiting, and the printer 20 need only have a plurality of ink colors. For example, the printer 20 may have four colors cmyk, six colors in which light cyan and light magenta are added to the four colors cmyk, or a plurality of more than six colors.

The color standard of the Japan Color certification system is used in the embodiment described above, but another generic color standard may also be used. For example, DIC (DIC Standard Color), TOYO (Toyo Ink Standard Color), SWOP (US Standard Color), EURO Standard (European Standard Color), or another color standard may be used.

In the embodiment described above, the pre-deformation color values used in the color compensation conversion LUT 66 are CMYK values that are combinations of primary colors used in a generic color standard, but this configuration is not limiting, and a combination of a plurality of ink colors of the printer 20 may also be used. In this case, cmykop values representing combinations of all of the plurality of ink colors of the printer 20 may be used. Alternatively, providing for versatility between printers, combinations of cmyk values as primary colors normally used by such printers may be used. Combinations of ink colors used by the printer 20 can thereby be outputted as the color compensation data, and printing of the image on the medium S by the printer 20 can therefore be smoothly initiated after the color compensation data are created.

In the embodiment described above, the grid 92 of the medium S is composed of square elements, but this configuration is not limiting, and each element may be a triangle, rectangle, diamond, or any other polygon.

In the embodiment described above, the CMYK values of the grid points are compressed to a normal printing range to create the color compensation data, but this configuration is not limiting, and the CMYK values of the grid points may be used to create color compensation data without being compressed. However, the color values are preferably compressed as in the present embodiment to ensure versatility.

In the embodiment described above, the color compensation conversion LUT 66 is stored in the HDD 55, but this configuration is not limiting, and the color compensation conversion LUT 66 may be stored in the flash memory 53 or another memory.

In the embodiment described above, the area variation ratio Δs of the quadrangle that has the grid point to be processed in any corner thereof is used as the area variation ratio Δs of the quadrangle that corresponds to a grid point to be processed, but this configuration is not limiting, and in the case that there are a plurality of quadrangles that have the grid point to be processed in a corner thereof, the average or median of the area variation ratios Δs of the plurality of quadrangles may be used.

In the embodiment described above, values in the Lab color space are used as the post-deformation color values of the color compensation conversion LUT 66, but this configuration is not limiting, and values of an RGB color space, a CMYK color space, or another color space may also be used.

In the embodiment described above, area variation ratios Δs are used as degrees of deformation in the color compensation conversion LUT 66, but this configuration is not limiting, and an elongation ratio or any other indicator of the degree of deformation may be used. Ranges of 100% or greater are also used for the area variation ratio Δs, but ranges of reduction to less than 100% may also be included.

In the embodiment described above, the three-dimensional coordinates (position information) of grid points after molding are described as being acquired by a software program in the shape compensation processing, but this configuration is not limiting, and three-dimensional coordinates of grid points may also be acquired by measuring the positions of the grid points in a molded article obtained by actually molding the medium S on which the grid is formed. In this case, shape compensation processing can be performed by a procedure such as the following. For example, a grid is formed on a medium S of the same material as the desired product, and the positions of the grid points are recorded as two-dimensional coordinates. The medium S is then molded by the molding device 40 under the same molding conditions (temperature, pressure, and other conditions) as for the actual molded article. The positions of the grid points on the molded medium S are then measured by an instrument for measuring in three dimensions, the measured positions of the grid points are recorded as three-dimensional coordinates, and position information can be obtained by correlating the coordinates from before and after deformation. The position information may be acquired at this time by inputting the three-dimensional coordinates of the measured grid points through use of the input device 57.

In the embodiment described above, color compensation processing is performed using the color compensation conversion LUT 66 created in the form of a lookup table, but this configuration is not limiting, and pre-deformation color values may be computed by calculation using a correlation scheme for color values of desired colors, degrees of deformation, and pre-deformation color values stored in advance in the HDD 55.

Ink is used as the colorant in the embodiment described above, but this configuration is not limiting, and any colorant may be used that is capable of forming an image on the medium S. For example, the colorant may be a fluid such as a gel, toner or other particles, or the like. The ink may also be a solvent solution, or a liquid body (liquid dispersion) in which grains of a functional material are dispersed. The ink may also include a liquid other than a solvent or liquid dispersion.

GENERAL INTERPRETATION OF TERMS

In understanding the scope of the present invention, the term "comprising" and its derivatives, as used herein, are intended to be open ended terms that specify the presence of the stated features, elements, components, groups, integers, and/or steps, but do not exclude the presence of other unstated features, elements, components, groups, integers and/or steps. The foregoing also applies to words having similar meanings such as the terms, "including", "having" and their derivatives. Also, the terms "part," "section," "portion," "member" or "element" when used in the singular can have the dual meaning of a single part or a plurality of parts. Finally, terms of degree such as "substantially", "about" and "approximately" as used herein mean a reasonable amount of deviation of the modified term such that the end result is not significantly changed. For example, these terms can be construed as including a deviation of at least ±5% of the modified term if this deviation would not negate the meaning of the word it modifies.

While only selected embodiments have been chosen to illustrate the present invention, it will be apparent to those skilled in the art from this disclosure that various changes and modifications can be made herein without departing from the scope of the invention as defined in the appended claims. Furthermore, the foregoing descriptions of the embodiments according to the present invention are provided for illustration only, and not for the purpose of limiting the invention as defined by the appended claims and their equivalents.

What is claimed is:

1. An image processing device for forming data of an image that is formed on a pre-deformed portion of a deformable object such that a color of the image on a post-deformed portion of the deformable object approximates a predetermined color, the deformable object being obtained by deforming a shape of a medium on which the image is formed, the post-deformed portion being a predetermined portion of the deformable object, the pre-deformed portion corresponding to the predetermined portion of the deformable object before the shape of the medium is deformed, the image processing device comprising:

a storage part configured to store a correlation between a pre-deformation color information, a degree-of-deformation information, and a post-deformation color information, the pre-deformation color information including a color information on the image that is formed on the pre-deformed portion, the degree-of-deformation information including a degree of deformation with respect to a deformation of the shape of the medium, the post-deformation color information including a color information of the image on the post-deformed portion, which reflects a color variation caused by deforming the medium by the degree of deformation;

an acquisition part configured to acquire the degree-of-deformation information on the post-deformed portion and a color designation information designating a color of the image on the post-deformed portion; and a determination part configured to determine a color of the image that is formed on the pre-deformed portion based on the degree-of-deformation information on the post-deformed portion and the color designation information on the post-deformed portion, and the correlation such that the color of the image approximates the color designation information.

2. The image processing device according to claim 1, wherein the correlation is created in advance by deforming a color sample including a plurality of colors with different area variation ratios and measuring the colors after a shape of the color sample is deformed, such that each color value of the colors of the color sample is designated as the pre-deformation color information, a post-deformation measured color value of the colors of the color sample is designated as the post-deformation color information, and each of the area variation ratios is designated as the degree-of-deformation information.

3. The image processing device according to claim 1, wherein the correlation is created in advance for each type of the medium.

4. The image processing device according to claim 1, further comprising
a position information input part configured to form a grid having a plurality polygons as elements in advance on the medium before the shape of the medium is deformed, and to input position information of each grid point of the grid before and after the shape of the medium is deformed,
the acquisition part being configured to acquire a color of each of the elements as the color designation information for each region of the deformable object and to acquire the area variation ratio of each of the elements as the degree-of-deformation information for each region of the deformable object,
the determination part being configured to determine the color of each of the elements based on the correlation and the area variation ratios of the element.

5. The image processing device according to claim 1, wherein
the correlation includes a color value determined by a combination of primary colors in a generic color standard, and the color value is specified as a color of the image that is formed on the pre-deformed portion of the deformable object.

6. The image processing device according to claim 1, wherein
the correlation includes a color value determined by a combination of colorants used for forming the image on the medium, and the color value is specified as a color of the image that is formed on the pre-deformed portion of the deformable object.

7. The image processing device according to claim 1, wherein
the correlation includes a color value determined by a color space of displayable hues, and the color value is specified as the color of the image on the post-deformed portion of the deformable object.

8. The image processing device according to claim 1, wherein
the correlation is a relationship created as a lookup table.

9. An image processing method for a deformable object obtained by deforming a shape of a medium on which an image is formed, the image processing method comprising:
acquiring, by an acquisition part, a degree-of-deformation information on a post-deformed portion and a color designation information, the degree-of-deformation information including a degree of deformation with respect to a deformation of the shape of the medium, the post-deformed portion being a predetermined portion of the deformable object, the color designation information designating a color of the image on the post-deformed portion; and
determining, by a determination part, a color of the image that is formed on a pre-deformed portion based on the degree-of-deformation information on the post-deformed portion and the color designation information on the post-deformed portion, and a correlation such that a color of the image approximates the color designation information, the pre-deformed portion corresponding to the predetermined portion of the deformable object before the shape of the medium is deformed, the correlation including a pre-deformation color information, the degree-of-deformation information, a post-deformation color information, the pre-deformation color information including a color information on the image that is formed on the pre-deformed portion, the post-deformation color information including a color information of the image on the post-deformed portion, which reflects a color variation caused by deforming the medium by the degree of deformation.

10. The image processing method according to claim 9, further comprising:
creating, by a correlation creation part, the correlation by deforming a color sample with different area variation ratios, measuring colors of the color sample after a shape of the color sample is deformed, and correlating each color value of the colors of the color sample before the shape of the color sample is deformed as the pre-deformation color information and each color value of the colors of the color sample after the shape of the color sample is deformed as the post-deformation color information, and with respect to each of the area variation ratios is designated as the degree-of-deformation information.

11. A non-transitory computer usable medium storing a computer program for causing is a relationship in which one or more computers to execute steps of the image processing method according to claim 9.

12. A printing system comprising:
a personal computer provided with a memory unit including the non-transitory computer usable medium according to claim 11; and
a printer configured to print the image based on printing data outputted from the personal computer.

* * * * *